(12) United States Patent
Ohkawa

(10) Patent No.: US 6,894,740 B2
(45) Date of Patent: May 17, 2005

(54) SURFACE LIGHT SOURCE DEVICE AND LIQUID CRYSTAL DISPLAY

(75) Inventor: Shingo Ohkawa, Yoshikawa (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/319,535

(22) Filed: Dec. 16, 2002

(65) Prior Publication Data

US 2003/0156403 A1 Aug. 21, 2003

(30) Foreign Application Priority Data

Dec. 21, 2001 (JP) .................................... 2001-389666

(51) Int. Cl.$^7$ .................... G02F 1/1335; F21V 7/04
(52) U.S. Cl. ........................ 349/67; 349/64; 362/31
(58) Field of Search ................ 349/61–67; 362/31

(56) References Cited

U.S. PATENT DOCUMENTS 5,961,198 A * 10/1999 Hira et al. ............... 362/31
6,305,811 B1 * 10/2001 Beeson et al. ........... 362/31
6,530,671 B2 * 3/2003 Mori et al. .............. 362/31

* cited by examiner

Primary Examiner—Dung T. Nguyen
(74) Attorney, Agent, or Firm—Staas & Halsey LLP

(57) ABSTRACT

Provided are surface light source devices and LCDs having isotropic and wide viewing angles. A surface light source device for illuminating an LCD comprises a light guide plate hiving a back face provided with a great number of micro-reflectors. Light beams P1, P2 representing an inner input light are inner-reflected by first and then second inner reflection faces or in inverse order, respectively to become a first and second inner output lights Q1 and Q2 which are non-parallel to each other, providing an emission having angular intensity characteristics showing two peaks. Peak splitting of the emission is dissolved by a light diffusion sheet disposed along an emission face of the light guide plate, causing an LCD panel to be illuminated by an isotropic and wide-view-angled illumination output light. The first and second inner reflection faces may be inclined oppositely and symmetrically to each other with respect to an imaginary reference plane that passes a valley bottom of a micro-reflector and extends perpendicularly to the emission face.

6 Claims, 17 Drawing Sheets

ANGULAR BRIGHTNESS CHARACTERISTICS (ONE-DIRECTION NO DIFFUSION SHEET)
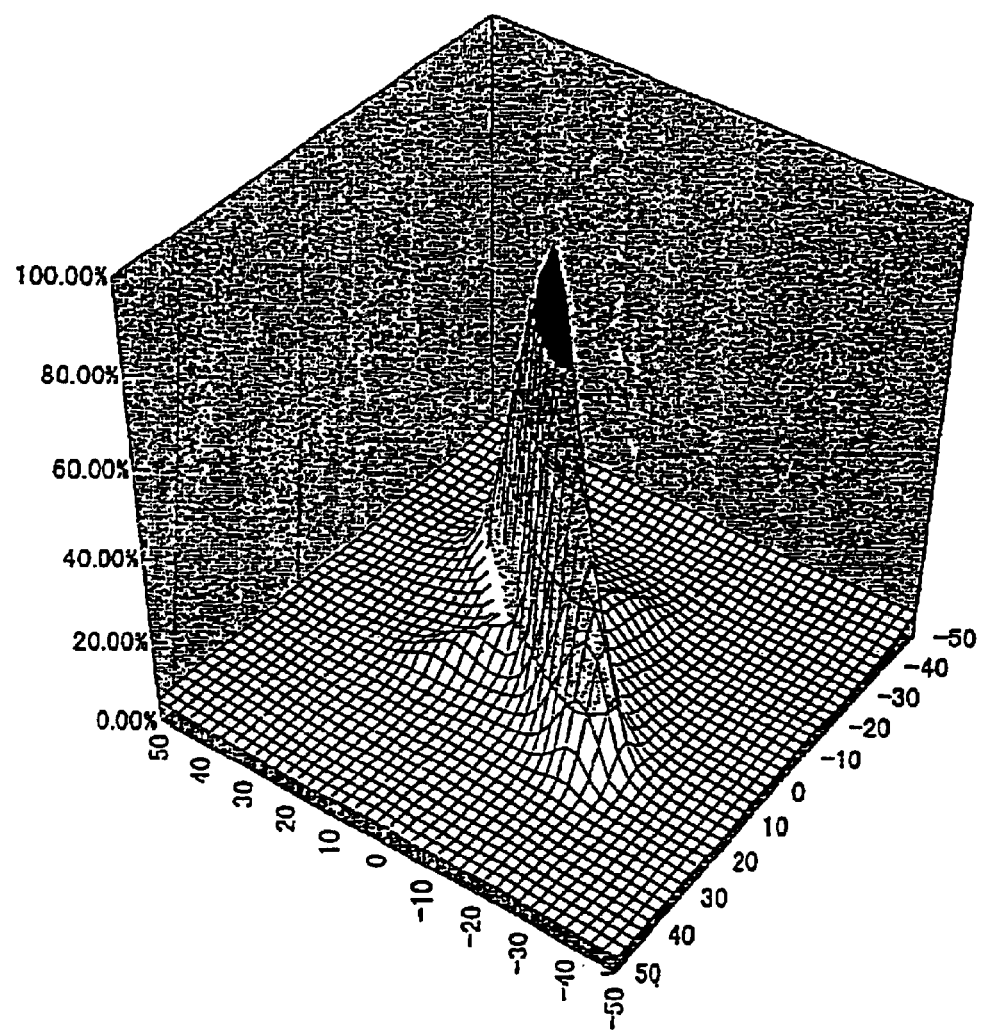
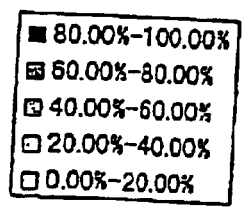
Fig.6
PRIOR ART

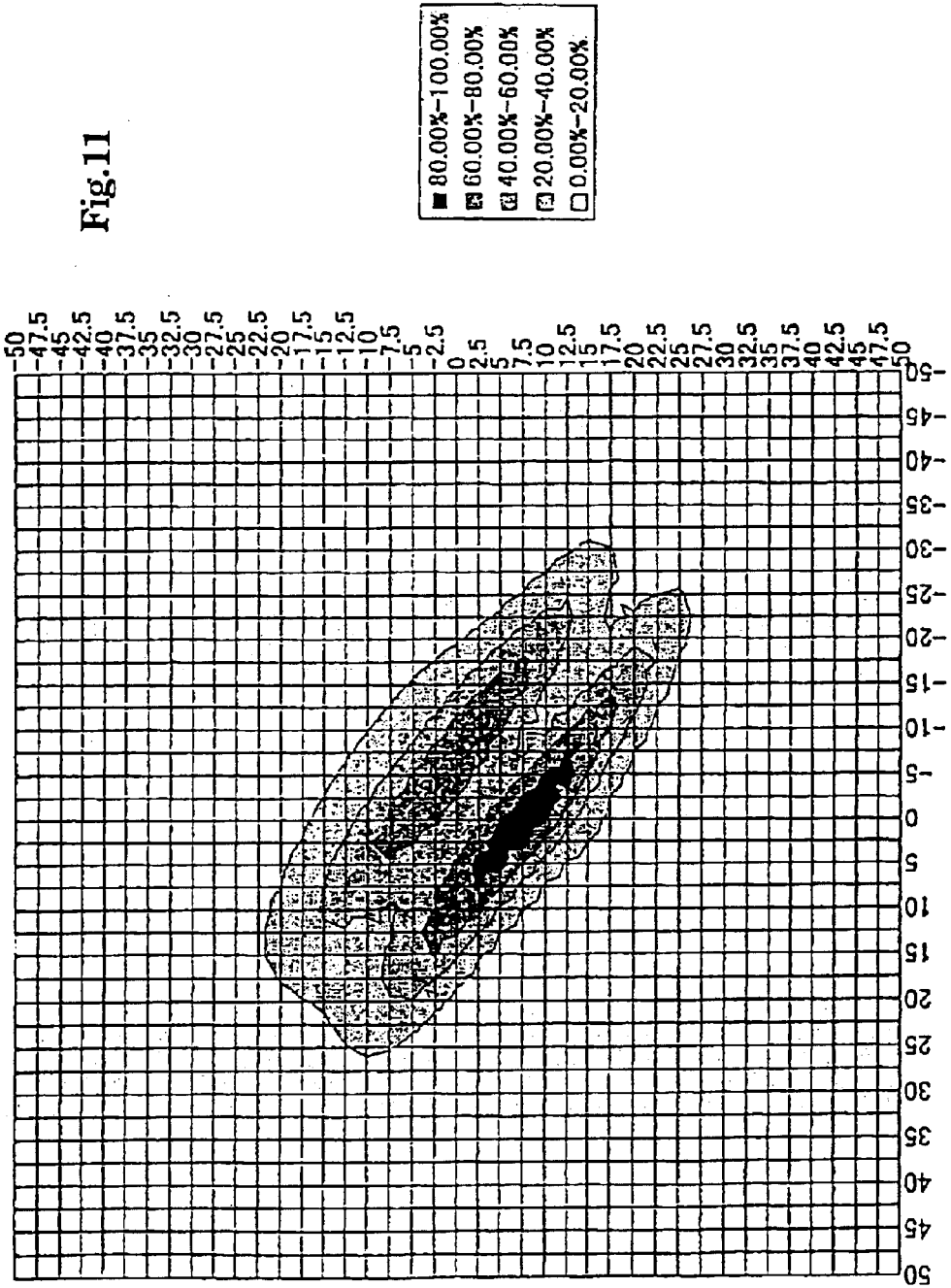

SURFACE LIGHT SOURCE DEVICE AND LIQUID CRYSTAL DISPLAY

BACKGROUND

1. Field of Invention

The present invention relates to a surface light source device and liquid crystal display, in particular, to a surface light source device utilizing a light guide plate having a back face provided with a great number of micro-reflectors and a liquid crystal display utilizing the surface light source device for illuminating a liquid crystal display panel.

The present invention is applied, for example, to liquid crystal displays in devices such as personal computers, car navigation systems or portable phones and surface light source devices used therein.

2. Related Art

A well-known surface light source device uses a light guide plate that has an end portion and an emission face, wherein light is supplied and introduced into the light guide plate through the end portion and is outputted through the emission-face, being applied to broad uses such as illumination of liquid crystal display panels.

Although rod-like fluorescent lamps (cold cathode tubes) have been broadly employed as primary light sources, those using point-like light emitter like LED (Light Emitting Diode) have been adopted growingly in recent years.

Surface light source devices of such a type introduce light into a light guide plate to redirect the light toward an emission face from which the light is outputted.

As known well, light-direction-conversion within a light guide plate and emission from an emission face are promoted by employing a light guide plate made of light scattering-guiding material, or by applying emission promoting processing such as making a back face or emission face light-diffusible.

However, as known well, such means causes the emitted light to be preferentially directed to much forward inclined directions (for example, about 60 degrees with respect to a frontal direction). Such largely inclined output directions are much quite different from usually desired output directions, that is, generally frontal directions or around them. According to a prior proposition to realize a direction-conversion capable of providing a preferential output direction which is desired, a great number of micro-reflectors are formed on a back face of a light guide plate.

According to the art using micro-reflectors, they are formed on the back face of a light guide plate like a great number of micro-projections, generating an inner propagation light proceeding toward an emission face by means of inner-face reflection of the projections. This inner propagation light is emitted from the emission face, becoming an output light. Here described is an example of arrangement comprising a light source device, which employs a light guide plate provided with micro-reflectors, for backlighting a liquid crystal display panel by referring to FIGS. 1 to 4.

In the first place, FIG. 1a is a back side plan view of an outlined arrangement of a surface light source device employing a light guide plate provided with micro-reflectors for backlighting of a liquid crystal display panel, and FIG. 1b is a side view from the left side in FIG. 1a. FIG. 2 illustrates an array example of micro-reflector 20 in the arrangement. In these illustrations, a light guide plate denoted by reference numeral 10 is made of a transparent material such as acrylic resin, polycarbonate (PC) or cycloolefin-type resin, a side end face of which provides an incidence face 12.

A rod-like primary light source (cold cathode tube) L1 is disposed along the incidence face 12 which is supplied with light from the primary light source. The light guide plate 10 has major faces 13 and 14 one of which provides an emission face 13. The other face (back face) 14 is provided with a great number of micro-reflectors 20 shaped like micro-projections.

A well-known liquid crystal display panel PL is disposed on the outside of the emission face 13 to provide a liquid crystal display of backlighting type. It is noted that the micro-reflectors 20 are not shown in FIG. 1a. Size values are merely examples, being indicated in mm.

The primary light source L1 emits light, which is introduced into the light guide plate 10 through the incidence face 12. An inner propagation light travels within the light guide plate 10 and undergoes direction-conversion on entering into micro-reflectors 20 through inner-reflections by inner faces of projections, with the result that light proceeding toward the emission face 13 is produced. Such inner reflection occurs twice generally as described later.

An example of arrangement of micro-reflectors 20 on the back face 14 of the light guide plate 10 is shown in FIG. 2. It is noted that the primary light L1 disposed along the incidence face 12 is a rod-like cold cathode tube having an emitting portion length of which is somewhat smaller than that of the incidence face 12.

Both ends are electrode portions EL1 and EL2 which are incapable of emitting light. Such a design is adopted often in order to avoid the electrode portions EL1 and EL2 of both ends from protruding.

Micro-reflectors 20 are distributed on the back face 14 so that covering rate tends to increase according to an increasing distance from the incidence face 12. Further to this, micro-reflectors 20 are arranged in corner area C and D located close to the electrode portions EL1 and EL2, respectively, at a specifically large covering rate.

Such a covering rate distribution prevents brightness from varying depending on distance from the incidence face 12 and from being short in the corner areas. It is noted that "covering rate" of micro-reflectors is defined as area occupied by micro-reflectors per unit area of a back face of a light guide plate.

Each micro-reflector 20 is shaped like a quadrangle-pyramid, projecting from a general plane representing the back face 14 (i.e. a plane formed by provisionally removing the micro-reflectors 20). Each micro-reflector 20 has a posture determined as to cause light approaching there to be inner-inputted efficiently and to be converted into an inner output light proceeding generally at right angles with respect to the emission face 13. Such processes are described with referring to FIGS. 3, 4a, 4b, and 4c.

FIG. 3 shows one of the micro-reflectors 20 with an illustration of direction conversion of an inner propagation light effected by the micro-reflector. In the illustration, the inner propagation light is represented by representative light beams P1 and P2. Beam P1 represents an inner propagation light which is inner-reflected by the slope 21 and then by the slope 22 in order while beam P2 represents an inner propagation light which is inner-reflected by the slope 22 and then by the slope 21 in order. Beams Q1 and Q2 represent inner output light beams produced from beams P1 and P2, respectively.

It is noted that a pair of beams P1 and P2 run in parallel with a main approaching direction of light which is inner-inputted in a corresponding micro-reflector 20. In FIG. 3, coordinate 0-XYZ is a right-hand coordinate used to denote directions, Z-axis of which extends vertically to the emission face 13 so that +Z-direction corresponds to a "frontal direction".

X-axis is perpendicular to both Z-axis and the incidence face 12, having an orientation (plus-minus sign) such that +X-direction extends as to get farther from the incidence face 12. Y-axis runs at right angles with respect to both Z-axis and X-axis as to provide a right-hand rectangular Cartesian coordinate 0-XYZ (having original 0 optionally positioned), extending in parallel with the incidence face 12.

For the sake of description in the instant specification, a rectangular Cartesian coordinate 0-xyz, which is independent of coordinate 0-XYZ, is defined for each micro-reflector. Defined are x-axis, y-axis and z-axis as follows.

In the first place, z-axis extends in the same direction (including orientation) as that of Z-axis, having +z-direction which corresponds to the "frontal direction"

A projection of a main approaching direction (including orientation) of light to be inner-inputted into a corresponding micro-reflector onto the emission face gives a direction of x-axis which extends perpendicularly to z-axis. And y-axis runs at right angles with respect to both z-axis and x-axis as to provide a right-hand rectangular Cartesian coordinate 0-xyz (having original 0 optionally positioned).

It should be carefully noted that x-axis may extend in a different direction as compared with X-axis and y-axis may extend in a different direction as compared with Y-axis in general, although 0-xyz accords with 0-XYZ in the case of the micro-reflector illustrated in FIG. 3.

For example, micro-reflectors arranged in the corner portions C and D shown in FIG. 2 give y-axes non-parallel with Y-axis and x-axes non-parallel with X-axis because projections of main approaching directions of inner input light to the micro-reflectors onto XY-plane are inclined with respect to X-axis.

As illustrated in FIG. 3, a micro-reflector 20 has a pair of slopes 21 and 22 located on a side farther from the incidence face 12, the slopes 21, 22 providing a first and second inner-reflection faces. Both slopes (inner-reflection faces; in the same way, hereafter) 21 and 22 form a valley in the light guide plate, meeting each other to form a valley bottom portion 25. Viewing from standpoint outside of the light guide plate, such a bottom portion 25 can be called "ridge portion".

There are another pair of slopes 23 and 24 located on a side nearer to the incidence face 12, the slopes meeting each other to form a ridge 26. It is noted that a foot line of a micro-reflector 20 (intersection between a micro-reflector and a general plane representing the back face 14) is shown by dotted lines in FIG. 3.

As described above, in this embodiment, each micro-reflector 20 gives the inside of the light guide plate a valley provided by slopes 21, 22 and another valley provided by slopes 24, 25.

Light beams P1 and P2, which represent an inner propagation light approaching a micro-reflector 20 via the incidence face 12, reach one of the slopes 21, 22 of the micro-reflector 20 from the incidence face 12 directly, or after being inner-reflected by the emission face 13 and/or back face 14. It is noted that some light may be directed to the slope 21 or 22 after being inner-reflected by the slope 23 or 24.

A large part of light reaching the slope 21 or 22 is inner-reflected by the slope 21 and then by the slope 22, or by the slope 22 and then by the slope 21, with the result that an inner propagation light proceeding toward the emission face 13 is produced. This light is emitted from the emission face 13 to provide output light Q1, Q2 of the light guide plate 10.

Thus a pair of 21 and 22 of each micro-reflector 20 function as a conversion output portion which inner-outputs light by converting a proceeding direction of an inner-inputted light. It is noted that references Q1 and Q2 are also used to denote emitted beams.

Some consideration is given to postures of micro-reflectors 20 as follows. FIGS. 4a, 4b and 4c illustrate from three directions how light representing beams P1 and P2 inner-inputted to a micro-reflector formed in a standard posture are converted into inner output light Q1 and Q2 proceeding toward a frontal direction.

FIG. 4a gives an illustration viewed from +z-axis direction (the same as +Z-direction due to definition), FIG. 4b gives an illustration viewed from +y-axis direction (the same as +Y-direction in this case), and FIG. 4c gives an illustration viewed from +x-axis direction (the same as +X-direction in this case).

Referring to these illustrations, behaviour of the above-mentioned representing beams P1 and P2 is described again with the use of the coordinate o-xyz.

As shown in FIG. 4a, representing beams P1 and P2 have an approaching direction to a micro-reflector 20 and the approaching direction provides a projection onto xy-plane in a direction consistent with +x-direction. Representing beams P1 and P2 inputted to the micro-reflector 20 are inner-reflected by the slopes 21 and 22 inclined with respect to every one of xy-plane, yz-plane and zx-plane, being converted into beams Q1 and Q2 directed toward +z-direction. This will be understood with ease specifically by referring to FIGS. 4b and 4c.

These beams Q1 and Q2 represent inner output light, being parallel to each other. Beams Q1 and Q2 are emitted from emission face 13 toward +z-direction.

In the instant specification, if such direction conversion is effected by each micro-reflector having a posture (as shown in FIGS. 4a, 4b and 4c), the posture is called "standard configuration". Standard configuration requires the following conditions 1, 2 and 3 to be satisfied at the same time.

Condition 1; A projection of an extending direction of, a valley bottom portion 25 onto xy-plane accords with x-axis direction (See FIG. 4a, specifically).

Condition 2; A bisectional plane, which bisects an angle made by a first and second inner-reflection faces 21 and 22 so that the valley bottom portion 25 extends on the bisectional plane (called merely "bisectional plane", hereafter), is perpendicular to xy-plane (See FIG. 4a specifically). In other words, the first and second inner-reflection faces 21 and 22 are inversely and symmetrically inclined with respect to a plane that passes the valley bottom portion 25 and extends perpendicularly to the emission face 13.

Condition 3; An inner input light inner-inputted to the micro-reflector from a main approaching direction (+x-direction) is converted into an inner output light proceeding toward +z-axis direction.

If a light guide plate has a back face provided with a great number of micro-reflectors 20 arranged in such standard configuration and the light guide plate is used in a surface light source device, primary light supplied sideways is converted directly into inner output light directed to a generally frontal direction which is outputted at a high efficiency, bringing a merit with a simple structure.

However, in prior arts employing micro-reflectors in the standard posture tends to cause the output light to have an excessive directivity, being suffered from a problem that a small deviation of viewing direction from a main emission direction (i.e. direction of Q1 and Q2) brings a sharp reduction in brightness (Narrow viewing angle).

In particular, a posture on z-axis is made fitting in with the above-mentioned Condition 1, there rises a drawback that viewing angle in zx-pane differs much from that in yz-pane and the latter (viewing angle in yz-pane) is very small.

FIGS. 5 and 6 are graphs to illustrate results of simulation calculation of angular characteristics of emission intensity in a case where a micro-reflector is used in the standard posture.

Abscissa in FIG. 5 and inclined-abscissa to the upper right indicate angles (inclination angles) in ZX-plane wherein plotting s with sign − correspond to a nearer side to the incidence face and plotting with sign + corresponds to a farther side from the incidence face.

Ordinate in FIG. 5 and inclined-ordinate to the upper left indicate angles (inclination angles) in YZ-plane, wherein plotting with sign + corresponds to right-handed inclinations as viewed from the incidence face and plotting with sign — corresponds to left-handed inclinations as viewed from the incidence face.

In FIGS. 5 and 6, light intensity after a well-known Cosine correction (correction of values in accordance with cosine of inclinations of a light measuring direction) is illustrated in five discrete-intensity-levels. FIG. 6 is a graph for three-dimensional indication prepared based on the graph of FIG. 5, wherein light intensity is indicated in discrete-density shades and three-dimensional iso-brightness curves, and height from a plane of axes rising to the upper right and to the upper left expresses brightness (light intensity) after Cosine correction.

A set of parameters r, s, t are used as required for indicating a posture of a micro-reflector with respect to the standard configuration. It is noted that direction-angles (degrees) around z-axis, x-axis and y-axis are expressed by r, s and t with respect to those of the standard posture, respectively. Of course, the standard configuration corresponds to r=s=t=0.

It is understood from the graphs that the single emission direction peak is shown as a direction of angles of about zero both in ZX-plane and YZ-plane, namely, being directed to a generally frontal direction. Further to this, FIG. 5 shows a grey-scale pattern shaped like a slender ellipse.

The ellipse has a longitudinal axis that corresponds approximately to +x-direction (inclined about 45 degrees with respect to +X-direction due to simulation condition in this case). Since +x-direction is nothing other than an orientation direction of micro-reflector 20 as viewed from the above the emission face 13 (i.e. an extending direction the of ridge 25), in short, the graphs of FIGS. 5 and 6 tell that the angular extent around the brightness peak direction is far from being isotropic.

Thus it is understood that emission face intensity has a specifically large gradient regarding ±y-directions. This means that only a small angular deviation of viewing from the peak direction (i.e. brightest viewing direction) regarding ±y-directions brings a sharp reduction in brightness, which gives usually undesirable characteristics.

This problem is relaxed to some degree if a light diffusing sheet or light diffusing plate is disposed along the emission face 13 of the light guide plate 10. An example demonstrating this is shown in graphs of FIGS. 7 and 8. FIGS. 7 and 8 show re-plotting under a condition such that light diffusion effected by a diffusing sheet is additionally considered in the simulation corresponding to FIGS. 5 and 6.

Abscissa and ordinate in FIG. 7 indicate the same as those in FIG. 5, and axes inclined to the upper right and left indicate the same as those in FIG. 6. Manners of light intensity indication in FIGS. 7 and 8 are also the same as those in FIGS. 7 and 8, respectively.

It is understood by comparing graphs of FIGS. 6 and 8 with graphs of FIGS. 5 and 7 respectively that there is single peak direction of emission directed to an approximately frontal direction. Further to this, FIG. 7 shows a less slender ellipse shading pattern as compared with that shown in FIG. 5 and that FIG. 8 shows a somewhat gentle rising as compared with a sharp rising shown in FIG. 6, which demonstrate some effectiveness.

However, it involves difficulties to intend to obtain sufficient angular extent of brightness around the peak direction by means of strong light diffusion ability because the stronger light diffusion ability the light diffusion member employed, the more light diffusion toward useless directions occurs.

Although it seems this problem could be avoided by adjusting posture of micro-reflectors so that the above Condition 1 is broken by a small angle, instead of the above way relying upon a light diffusion member, such posture adjusting fails to give a sufficient extent around the peak direction and, if Condition 1 is broken by a large angle, there arises a reduction in emission efficiency. If micro-reflector posture is adjusted as to break the above Condition 2, situation is generally not changed.

OBJECT AND SUMMARY OF INVENTION

An object of the present invention is to solve the above-mentioned problem and to provide a surface light source device that has an improved angular extent and isotropy around an output emission brightness peak direction. Another object of the present invention is to provide a liquid crystal display that has an excellent angular extent and isotropy of viewing field.

The present invention solves the above problem by employing a novel idea such that peak splitting of emission direction characteristics is made on purpose by adjusting postures of many micro-reflectors on a back face of a light guide plate regarding pitching on x-axis and then this peak splitting is substantially dissolved by means of a light diffusion member.

First, the present invention is applied to a surface light source device including a primary light source, a light guide plate supplied with light from the primary light source.

The light guide plate has a an emission face provided by a major face, a back face provided by another major face opposite with the emission face and an incidence face for being supplied with light from the primary light source, wherein the back is provided with a great number of projection-like micro-reflectors for light-travelling-direction-conversion. Each of the micro-reflectors has a conversion-output-portion including a first inner-reflection face and a second inner-reflection face.

The first and second inner-reflection faces provide a valley in the light guide plate and meet each other as to give a valley bottom of the valley. The valley is opened as to get deeper and wider toward a main light coming direction of an inner input light reaching the valley.

This produces an inner output light containing a first inner output light and a second inner output light from the inner input light reaching the valley, wherein the first inner output light is produced through being inner-reflected by the first inner-reflection face and then by the second inner-reflection face, and the second inner output light is produced through being inner-reflected by the second inner-reflection face and then by the first inner-reflection face.

According to the most basic and important feature, the first and second inner-reflection faces are inclined so that the first inner output light and the second inner output light are non-parallel and thereby the emission face provides a direction-split emission having two emission intensity peaks.

Preferably, the first and second inner-reflection faces are inclined symmetrically and oppositely each other with respect to an imaginary reference plane that passes said valley bottom and Is perpendicular to the emission face.

It should be noted that this condition can compatible with the above-mentioned basic feature (that is, the first and second inner-reflection faces are inclined so that the first inner output light and the second inner output light are non-parallel and thereby the emission face provides a direction-split emission having two emission intensity peaks; please see embodiments described later).

And, a light diffusion member is disposed along the emission face in order to input the direction-split emission having two intensity peaks thereto and to output an emission having a single emission intensity peak by substantially dissolving the direction-split emission.

Such an intentional peak split followed by split-dissolving causes an inner output light flux generated by each micro-reflector not only to have an extended angular range, in particular, in yz-plane but also to have emission intensity directivity characteristics that hardly shows an unnatural dropping. This provides the illumination output with a natural and small unbalance in directivity of brightness.

In addition, fine unevenness in brightness caused depending on micro-reflector-formed location or micro-reflector-absent location is expected to be reduced because an inner output light flux generated by each micro-reflector has an angularly expanded travelling direction range and gives an enlarged inner-incidence region (area).

It is important that improvements in angular extent and isotropy of-brightness or viewing field are realized by two steps, and that they are reinforced in the second step, after undergoing the first step, by means (i.e. light diffusion member) for dissolving speak splitting which can be regarded as an "ill effect" in the first step.

In other words, if directions of the first and second inner-reflection faces are selected as to bring a peak split, the inner output light flux has naturally an expanded angular extent, with the result that a first step improvement in angular extent and isotropy of brightness or viewing field is achieved.

And then the ill effect (peak splitting) arising in this first step is dissolved by the light diffusion member while a second step improvement in angular extent and isotropy of brightness or viewing field is achieved by means of light diffusing ability of the light diffusion member.

As described above, the present invention is featured by that a light diffusion member disposed along an emission face of a light guide plate functions as not only means for dissolving ill effects but also means for providing improved angular extent and isotropy of brightness or viewing field.

Next, the present invention is applied to a liquid crystal display including a surface light source device for illumination a liquid crystal display panel. The employed surface light source device is one improved as above. It is needless to say that the above-described effects and advantages reflect on the liquid crystal display, with the result that the liquid crystal display shows an isotropic expanded viewing angle free from biassing to a particular direction. Further to this, an reduced fine unevenness in brightness of the surface light source device give the liquid crystal display an improved display quality.

BRIEF DESCRIPTION OF DRAWINGS

FIG. 1b is a side view from the left side in FIG. 1a.

FIG. 6 is a graph made from the results of the same simulation calculation as in FIG. 5, wherein light intensity (after cosine-correction) is illustrated in gray scale levels and three-dimensional isobrightness curves are plotted;

FIG. 9b is a side view from the left side in FIG. 1a;

FIG. 11 is a graph to illustrate results of simulation calculation of angular characteristics of emission intensity in a case where a micro-reflector is used in the embodiment shown in the in the embodiment shown in FIG. 9 wherein light intensity (after cosine-correction) is illustrated in gray scale levels;

EMBODIMENTS

Description on a liquid crystal display of an embodiment in accordance with the present invention is provided hereafter. In the first place, an outlined arrangement is shown in FIGS. 9a and 9b is the same manner as FIGS. 1a and 1b, FIG. 9a being a plan view from a back face side of a light guide plate, and FIG. 9b being a side view from the left side in FIG. 9a.

Figure 1A:
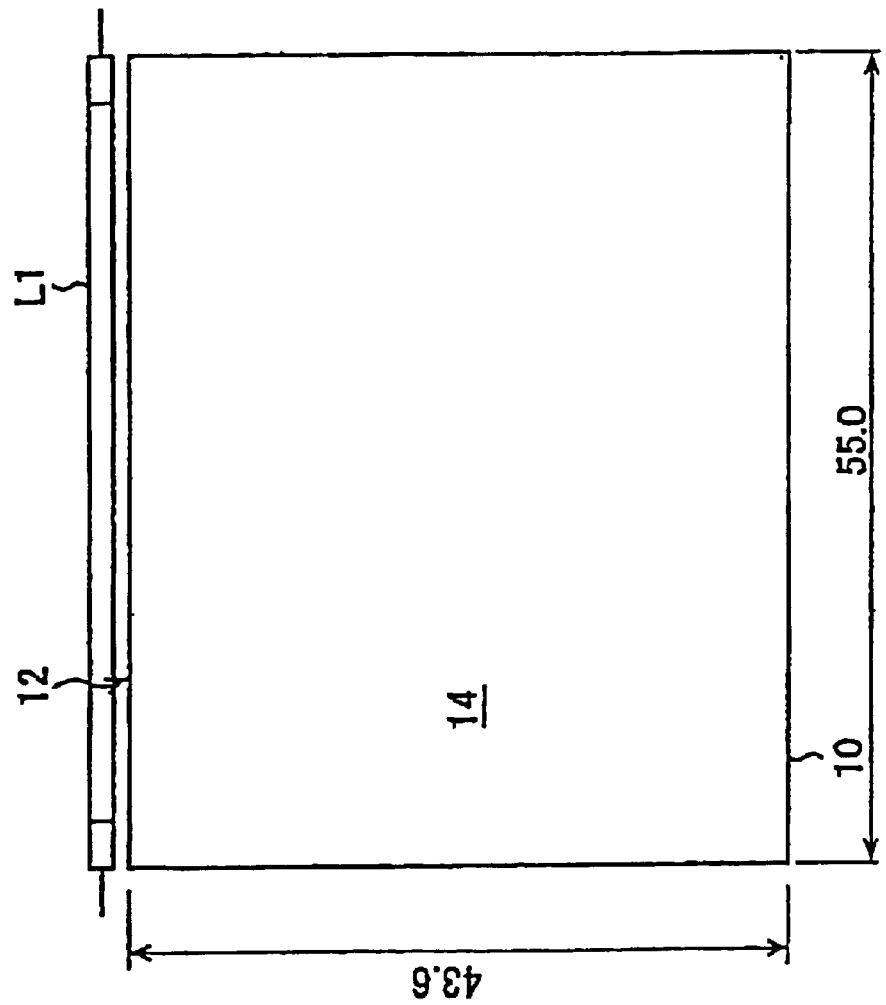
FIG. 1a is a back side plan view of a basic arrangement (prior art) of a surface light source device employing a light guide plate provided with micro-reflectors for backlighting of a liquid crystal display panel.
Figure 1B:
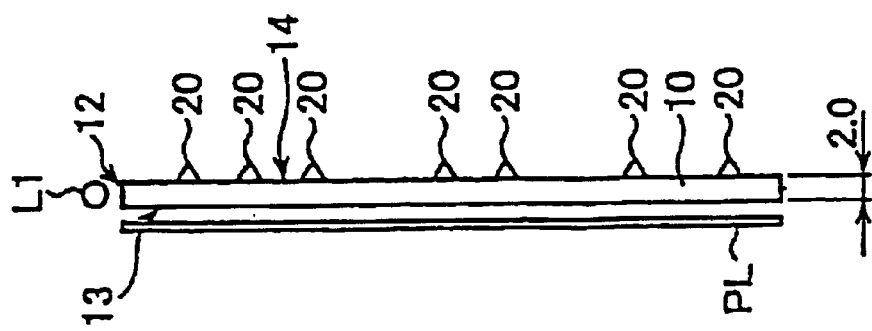
Figure 9A:
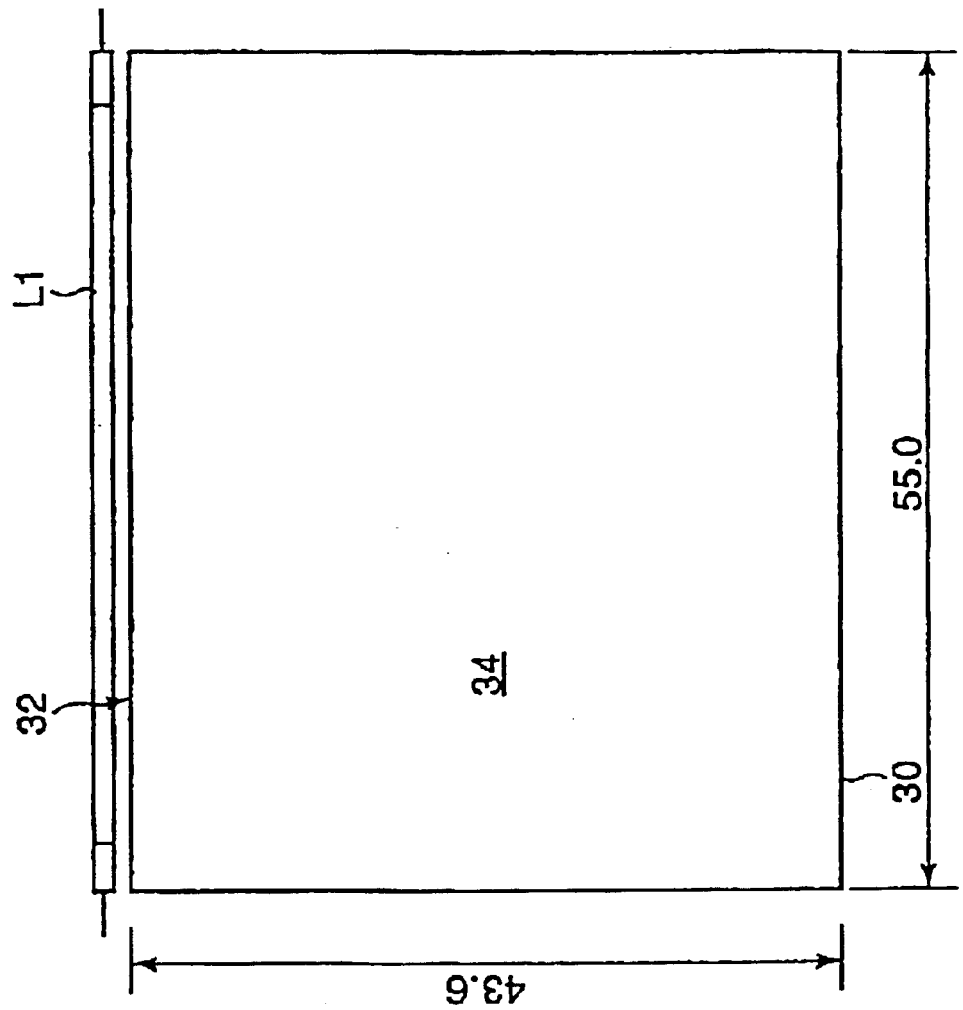
FIG. 9a is a back side plan view of a basic arrangement of a liquid crystal display in accordance with an embodiment of the present invention.
Figure 9B:
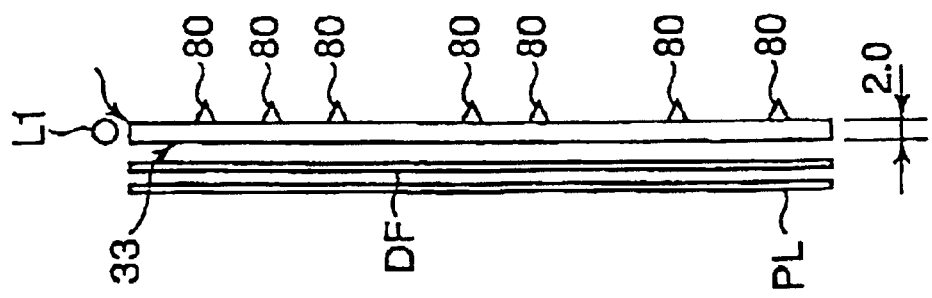

Although basic arrangement relation among a primary light source, light guide plate and liquid crystal display panel is the same as that shown in FIGS. 1a and 1b as shown in FIGS. 9a and 9b, a guide plate 30 provided with a feature of the present invention is employed instead of the light guide plate 30 and a light diffusion sheet DF is interposed between the light guide plate 30 and liquid crystal display panel PL.

The light guide plate 30 is made of a transparent material such as acrylic resin, polycarbonate (PC) or cycloolefin-type resin, like the light guide plate 10. A side end face of the light guide plate 30 provides an incidence face 32. A rod-like primary light source (cold cathode tube) L1 is disposed along the incidence face 32 which is supplied with light from the primary light source. The light guide plate 30 has major faces 33 and 34 one of which provides an emission face 33, the other major face providing a back face 34.

The back face 34 is provided with a great number of micro-reflectors 80 shaped like micro-projections. A well-known liquid crystal display panel PL is disposed on the outside of the emission face 33 so that a light diffusion sheet DF is interposed, as forementioned, between the emission face 33 and the liquid crystal display panel PL. It is noted again that the micro-reflectors 80 are not shown in FIG. 9a and size value indications are merely examples like those in FIGS. 1a and 1b.

The primary light source L1 emits light, which is introduced into the light guide plate 30 through the incidence face 32. An inner propagation light travels within the light guide plate 30 and undergoes direction-conversion on entering into micro-reflectors 80 through inner-reflections, with the result that light proceeding toward the emission-face 33 is produced.

Figure 2:
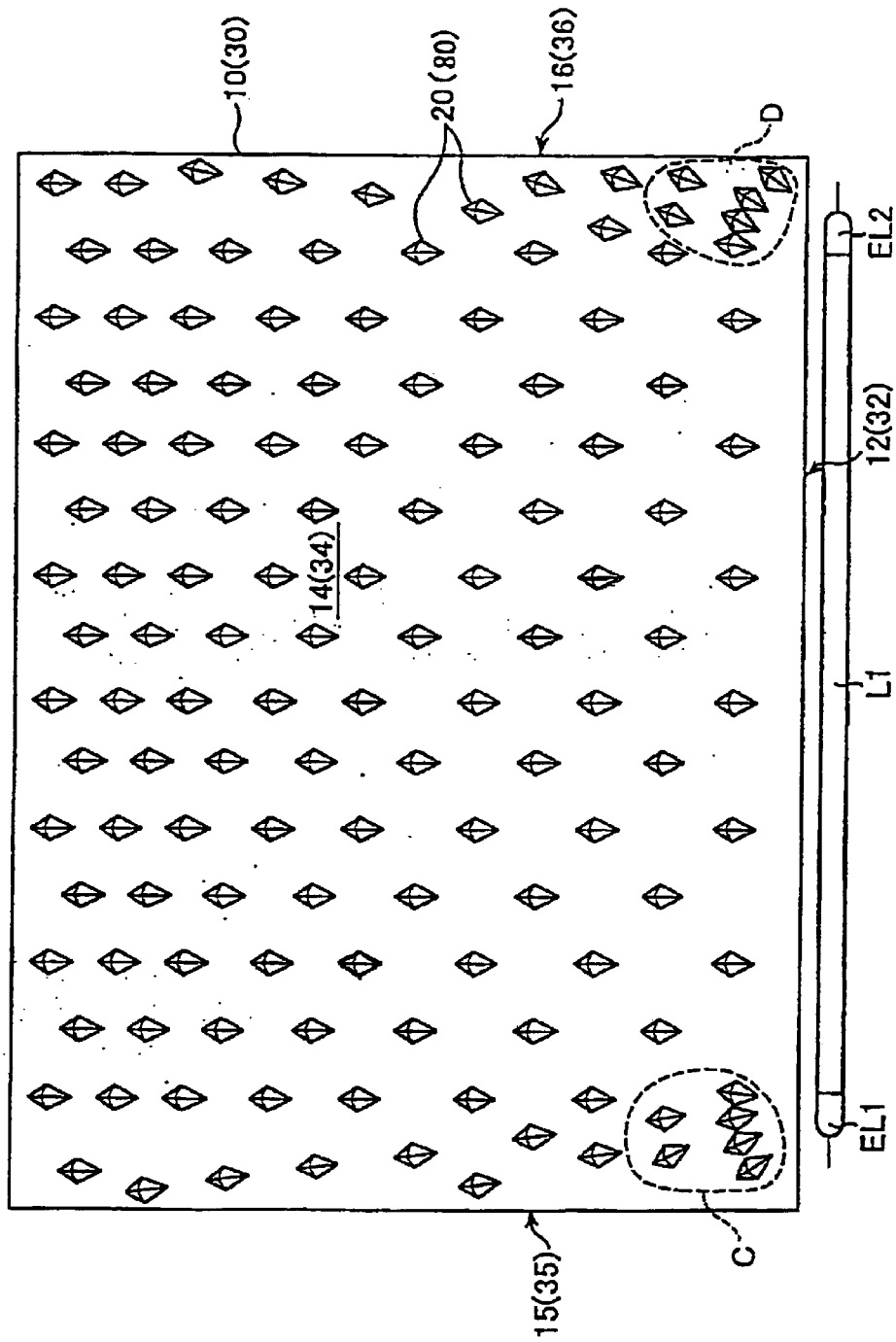
FIG. 2 illustrates an array example of micro-reflectors 20 on a back face of each light guide plate shown in FIGS. 1a, 1b or FIGS. 9a, 9b.

Such inner-reflections occur twice generally in the same way as the prior-art employing the light guide plate 10. It is assumed that the arrangement of the micro-reflectors 80 on the back face 34 of the light guide plate 30 is the same as that shown in FIG. 2. That is, the micro-reflectors 80 (bracketed numeral) are distributed on the back face 34 of the light guide plate denoted by bracketed numeral 30 in FIG. 9, so that covering rate tends to increase according to an increasing distance from the incidence face 32.

Micro-reflectors 20 are arranged at a specifically large covering rate in corner area C and D located close to the electrode portions EL1 and EL2, respectively. Such a covering rate distribution prevents brightness from varying depending on distance from the incidence face 32 and from being short in the corner areas. Each micro-reflector 80 is shaped like a quadrangle-pyramid,;projecting from a general plane representing the back face 34 (i.e. a plane formed by provisionally removing the micro-reflectors 80).

Each micro-reflector 80 is shaped somewhat differently as compared with one in the prior arts while there is difference little in posture. Therefore, Condition 3 of the above Conditions 1 to 3 is broken while Conditions 1 and 2 is maintained. That is, the micro-reflector 80 is shaped so that non-parallel inner output light fluxes are generated as maintaining the standard configuration (s=t=r=0 degree) while the forementioned prior art uses micro-reflectors in the standard configuration as maintaining the foresaid Conditions 1 to 3 (as shown in FIGS. 4a to 4c).

Figure 4A:
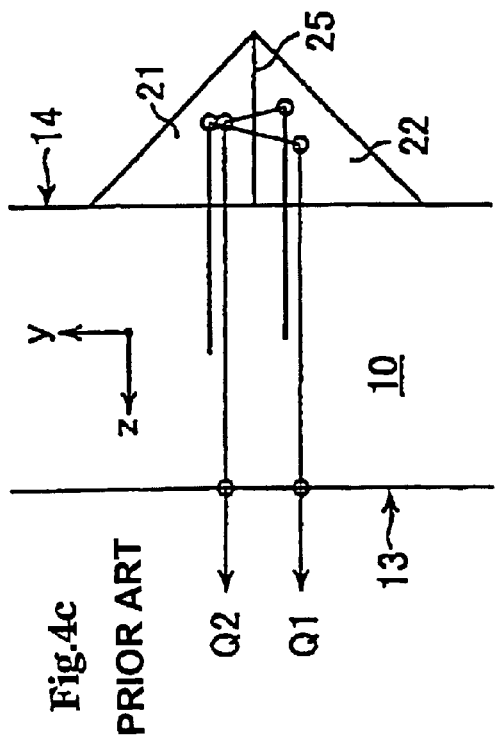
FIG. 4a illustrates light paths of representative beams P1, P2 inputted in a micro-reflector employed in a standard configuration as viewed from +z-axis direction, FIG. 4b illustrating the same as viewed from +y-axis direction, and FIG. 4c illustrating the same as viewed from +x-axis direction.
Figure 4C:
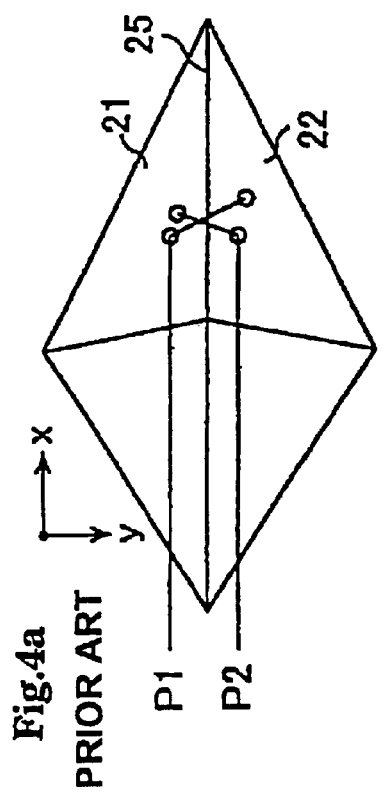
Figure 4B:
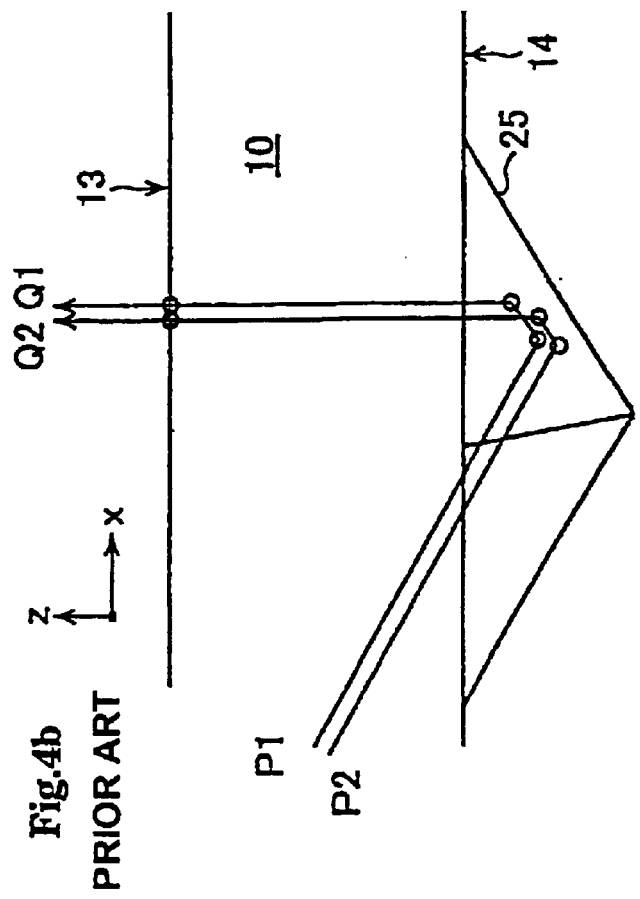
Figure 10A:
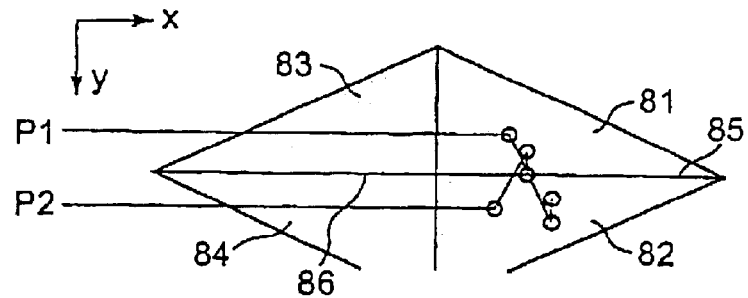
FIG. 10a illustrates light paths of representative beams P1, P2 inputted in a micro-reflector employed in the embodiment shown in FIG. 9 as viewed from +z-axis direction, FIG. 10b illustrating the same as viewed from +y-axis direction, and FIG. 9c illustrating the same as viewed from +x-axis direction.
Figure 10B:
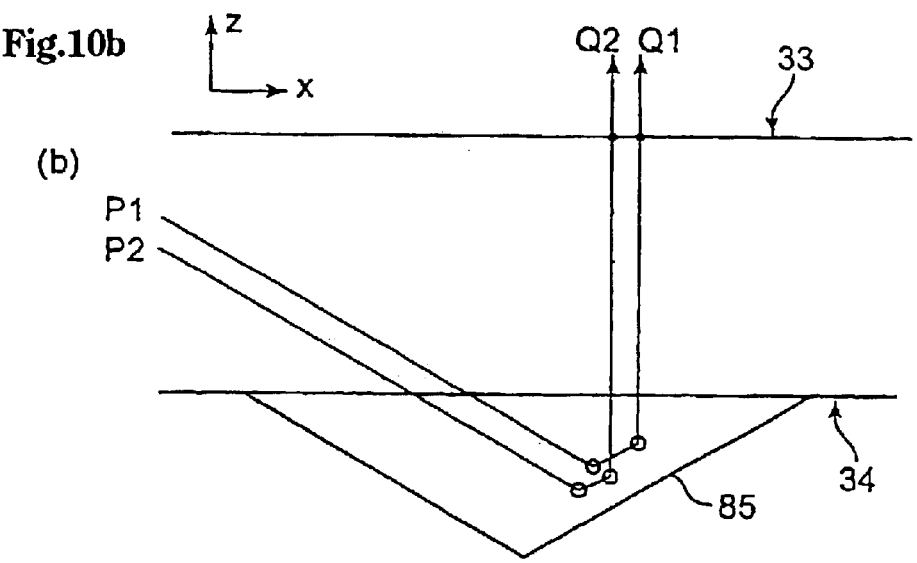
Figure 10C:
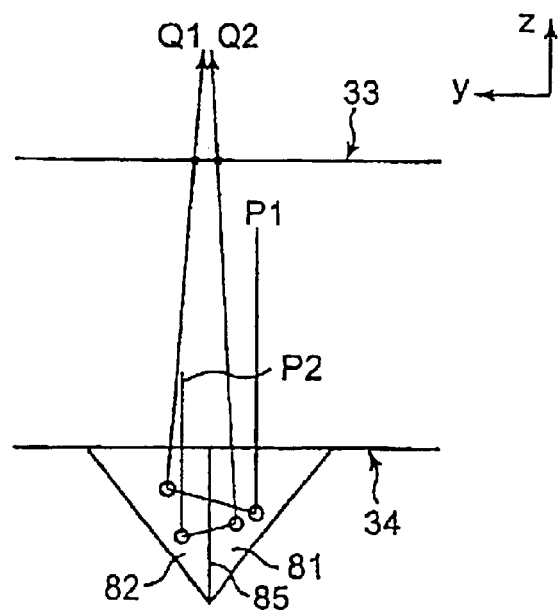

For such a micro-reflector 80, FIGS. 10a, 10b and 10c illustrate light paths of representative beams P1, P2, which are converted into fluxes of inner output light Q1, Q2 and emitted from the emission face 33 in an illustration manner like FIGS. 4a to 4c. FIGS. 10a, 10b and 10c give views from +z-axis direction, from +y-axis direction and from +x-axis, respectively.

Each micro-reflector 80 is shaped like a quadrangle-pyramid, like micro-reflector 20, providing a micro-projection projecting from the back face 34. First and second inner-reflection faces 81 and 82 correspond to the inner-reflection faces 21 and 22 of the micro-reflector 20, respectively.

Both inner-reflection faces 81 and 82 form a valley within the light guide plate 30, meeting each other to form a valley bottom portion 85. Viewing from standpoint outside of the light guide plate 30, such a bottom portion 85 can be called "ridge portion". There are another pair of slopes 83 and 84 located on a side nearer to the incidence face 32, the slopes meeting each other to form a ridge 86.

In the same manner as in FIGS. 4a to 4c, light beam P1 represents inner input light that is inner-reflected by the first inner-reflection face 81 and then by the second inner-reflection face 82 while light beam P2 represents inner input light that is inner-reflected, in reversed order, by the second inner-reflection face 82 and then by the first inner-reflection face 81, the beams P1 and P2 travels in parallel with a main approaching direction to the micro-reflector 80.

As shown in FIGS. 10a, 10b and 10c, inner input light represented by the beam P1 is inner-reflected by the first and second inner-reflection faces 81 and 82 of the micro-reflector 80 successively, with the result that an inner output light (first inner output light) Q1 traveling toward the emission face 33 is produced. In the same way, inner input light represented by the beam P2 is inner-reflected by the second and first inner-reflection faces 82 and 81 of the micro-reflector 80 successively, with the result that an inner output light (second inner output light) Q2 traveling toward the emission face 33 is produced.

An inner output light flux mainly composed of the first and second inner output lights Q1 and Q2 is emitted from the emission face 33 to become an output light of the light guide plate 30. Thus slopes 81, 82 of each micro-reflector 80 functions as a conversion output portion that outputs inner-inputted light after applying direction-conversion.

It is specifically important that the first and second inner-reflection faces 81 and 82 are designed as to be inclined somewhat steeply as shown in FIG. 10c. This causes the first and second inner output lights Q1 and Q2 to have (main) travelling directions which provide a non-parallel relation though deviation angles from being parallel is small. As a result, two peaks are generated in the intensity directivity characteristics of the light emitted from the emission face 33. In other words, the inner-reflection inclinations of the faces 81 and 82 are selected as to such a small-angle (preferably, about several degrees) peak split.

After all, one micro-reflector 80 provides a two-dimensionally expanded travelling direction distribution as compared with that obtained in the case of standard configuration (FIG. 4) because light is actually emitted from the emission face 33 as to be distributed around the representing beam Q1 and around the representing beam Q2.

It should be also noted that the inner output light Q1 and Q2 have already become expanded light fluxes when they reach the emission face 33. This reduces fine unevenness in brightness that could appear depending on presence/blank positions of micro-reflector 80.

Figure 5:
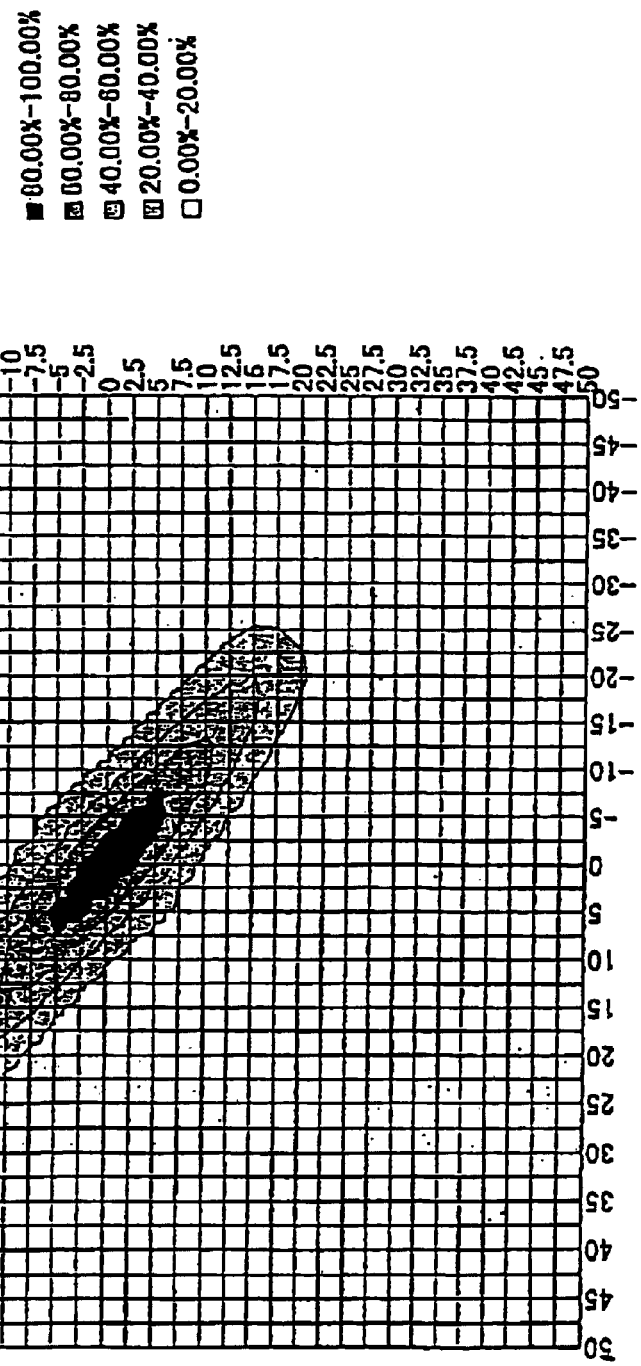
FIG. 5 is a graph to illustrate results of simulation calculation of angular characteristics of emission intensity in a case where a micro-reflector is used in the standard posture wherein light intensity (after cosine-correction) is illustrated in gray scale levels.
Figure 12:
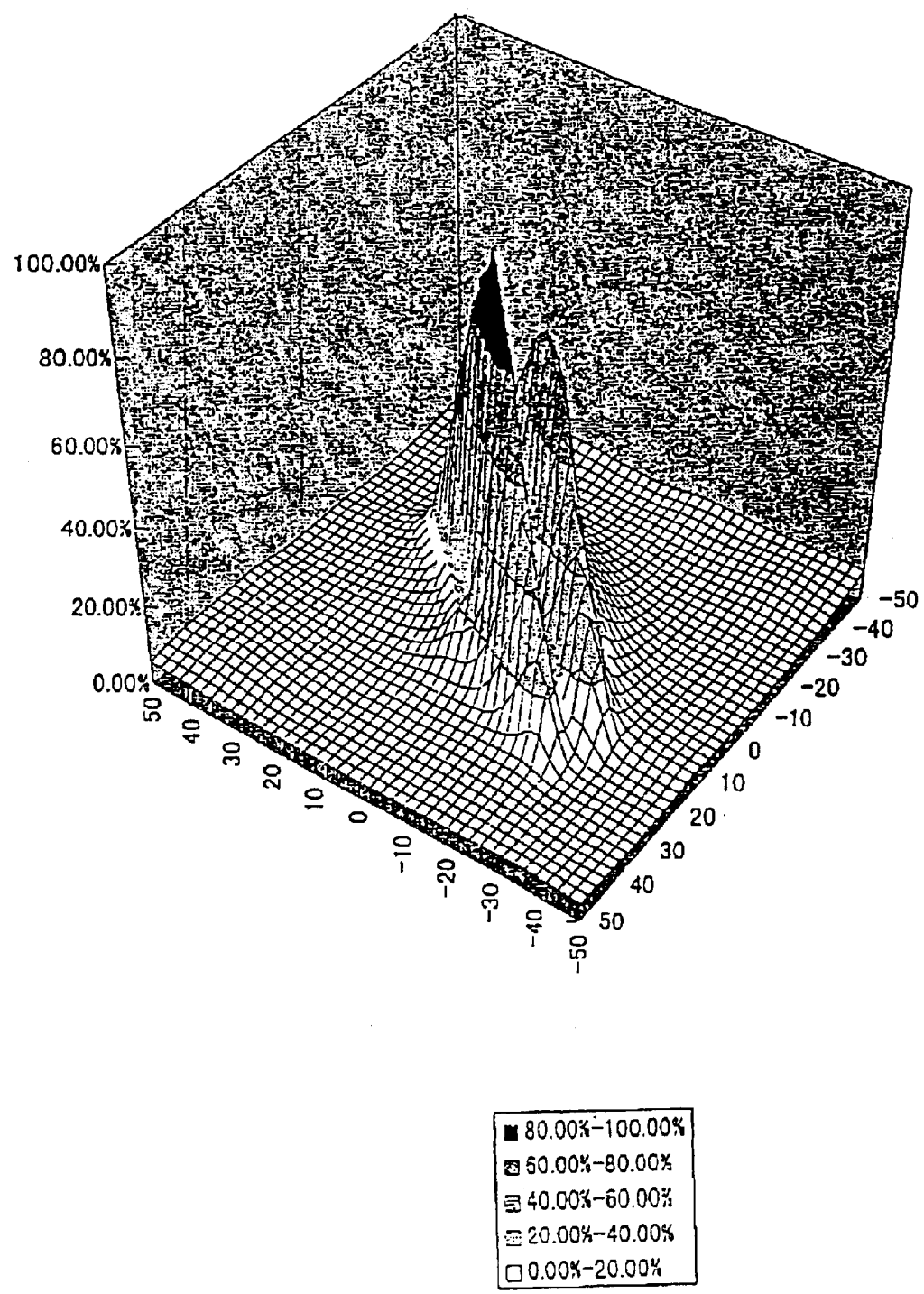
FIG. 12 is a graph made from the results of the same simulation calculation as in FIG. 11, wherein light intensity (after cosine-correction) is illustrated in gray scale levels and three-dimensional isobrightness, curves are plotted.

FIGS. 11 and 12 are graphs of an example showing results of simulation calculation of angular characteristics of emission intensity obtained from a micro-reflector 80 used in this embodiment. Format of plotting (abscissa and ordinate) in FIG. 11 is the same as in FIGS. 5 and 7 while inclined axes rising to the upper right and to the upper left in FIG. 12 are defined in the same manner as in FIGS. 6 and 8.

It is understood from the graphs of FIGS. 11 and 12 that emission direction peaks, split into two, appear as to sandwich a generally frontal direction and to provide a large dent (or saddle in FIG. 12) between them. It is to be noted, however, that this peak split involves an improved angular extent regarding ±y-axis directions as compared with the case of FIGS. 5 and 6 (standard configuration without peak split).

FIG. 11 shows a grey-scale pattern like two slender-ellipses which have longitudinal axes corresponding approximately to +x-direction (inclined about 45 degrees with respect to +X-direction due to simulation condition in this case).

It is further to be noted that +x-direction corresponds to an orientation direction of a micro-reflector 80 (i.e. running direction of valley bottom portion 85) as viewed from above the emission face 33. The reason why the two peaks have different heights in this result of simulation is that parameter r (posture around z-axis) was set at a value about several degrees. In this sense, there is some difference in simulation condition as compared with the illustration of FIG. 10a, but attention should be paid to that there is essentially no difference in mechanism of peak splitting.

As described above with referring to FIG. 9b, a light diffusion sheet DF is disposed along the emission face 3 of the light guide plate 30. Accordingly, the emission with peak split as above is inputted to the light diffusion sheet DF from an inside face, being outputted from an outside face.

The light diffusion sheet DF employed has light diffusion ability enough to substantially dissolve the above peak split. It is noted, however, that excessively high light diffusion ability would brings an increased loss of light and accordingly light diffusion ability is preferably just the minimum required for substantially dissolving the peak split or higher a little than the minimum.

In the embodiment, the liquid crystal display panel PL is supplied with an illumination output light consisting of light that is outputted as above from the outside of the light diffusion sheet DF. This illumination output light is not only substantially free from peak split due-to effects of the light diffusion sheet DF but also has an expanded angular extent of brightness.

Figure 13:
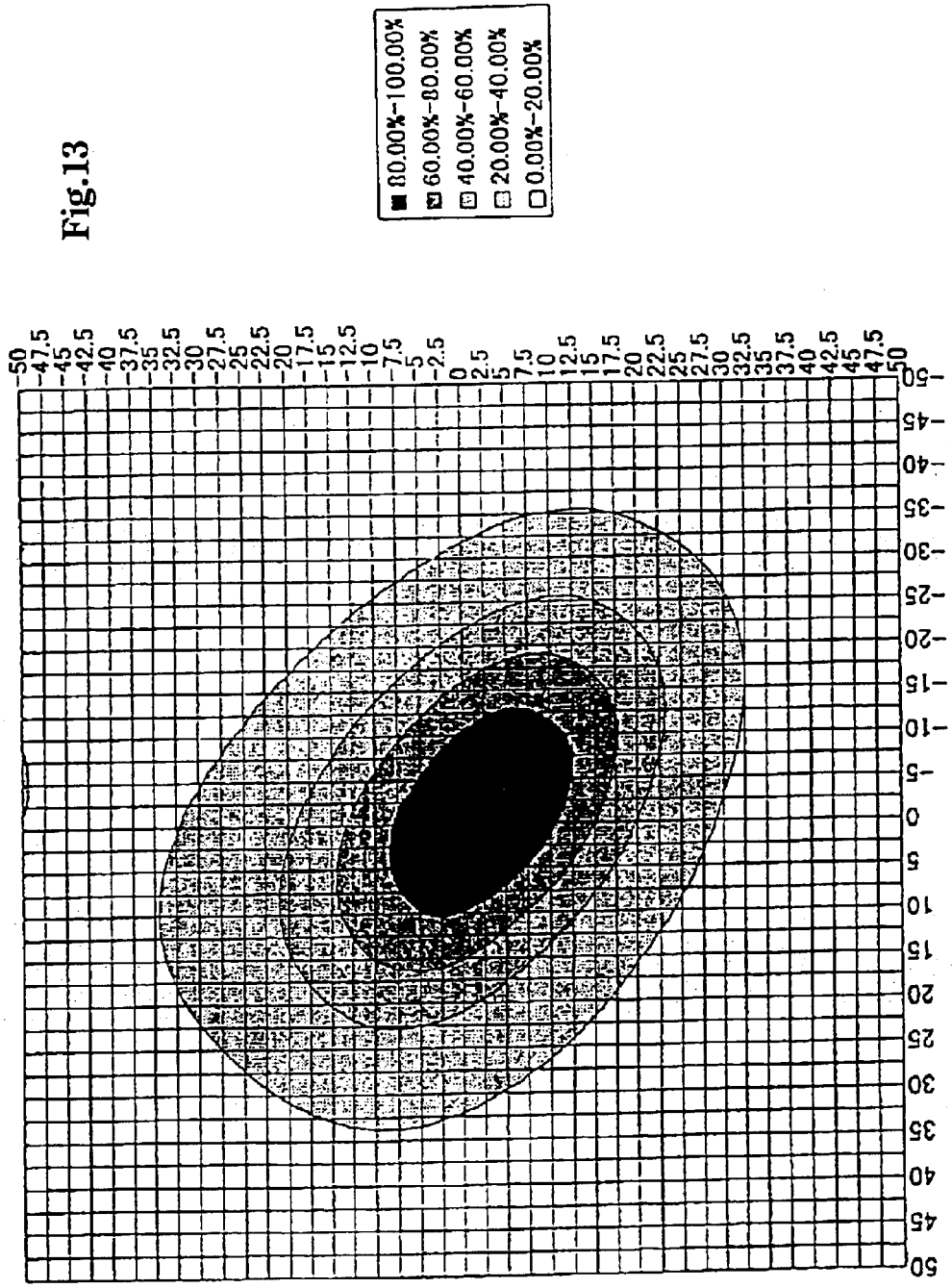
FIG. 13 is a graph shows an example of result obtained from a simulation calculation in a case under a condition such that a light diffusing sheet is disposed in addition to the arrangement considered in FIG. 11, wherein light intensity (after cosine-correction) is illustrated in gray scale levels.
Figure 14:
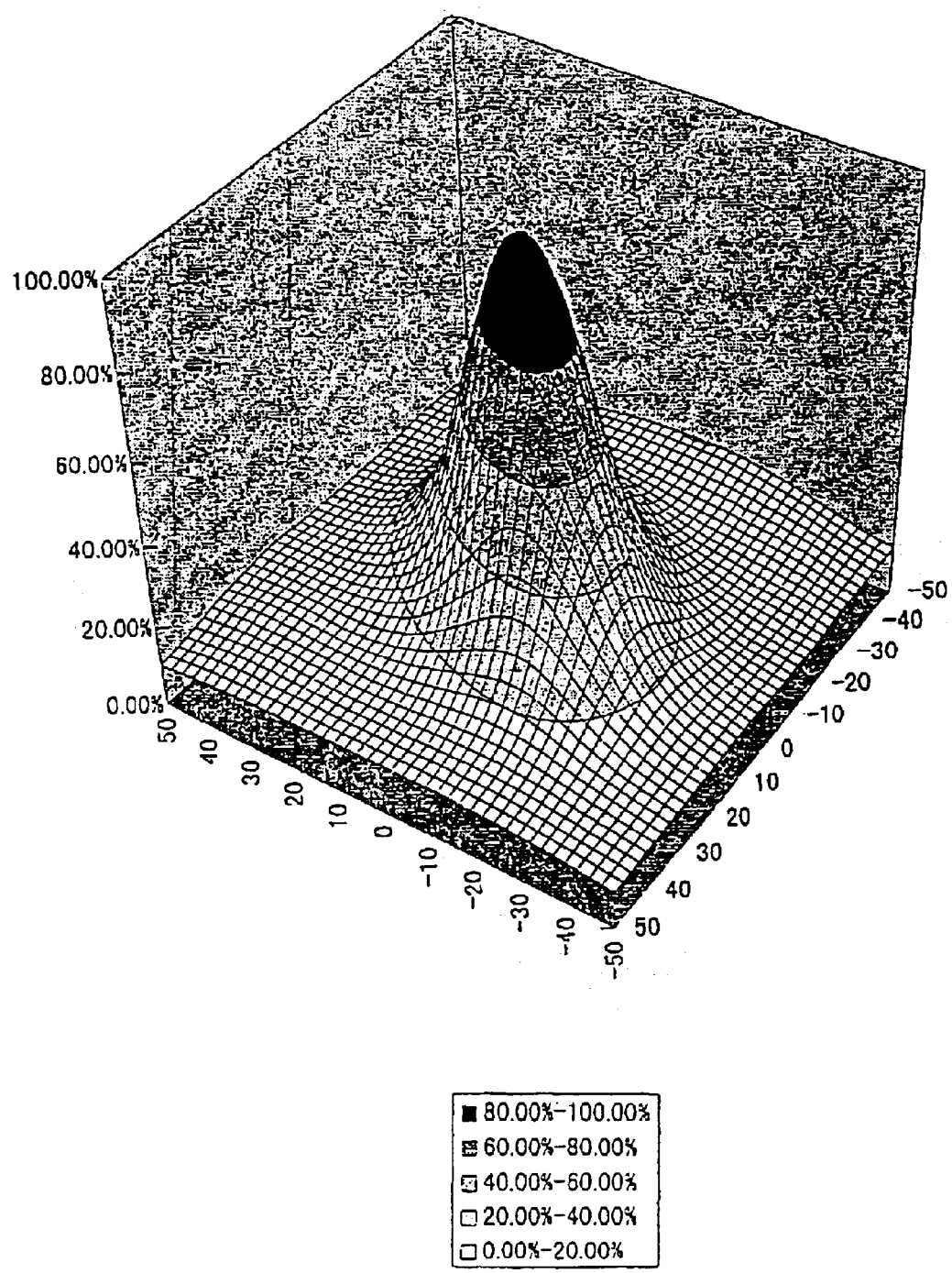
FIG. 14 is a graph made from the results of the same simulation calculation as in FIG. 13, wherein light intensity (after cosine-correction) is illustrated in gray scale levels and three-dimensional isobrightness curves are plotted.

FIGS. 13 and 14 show an example of result obtained from a simulation calculation for demonstrating directivity characteristics of outputting from the light diffusion sheet DF under being supplied with the light emitted from the emission face 33 with the emission intensity directivity characteristics as shown in FIGS. 11 and 12. Format of plotting (abscissa and ordinate) in FIG. 13 is the same as in FIGS. 5, 7 and 11 while inclined axes rising to the upper right and to the upper left in FIG. 14 are defined in the same manner as in FIGS. 6, 8 and 12. Illustration manners of light intensity in FIG. 13 is the same as in FIGS. 5, 7 and 11 while illustration manners of light intensity in FIG. 14 is the same as in FIGS. 6, 8 and 12.

It is clear by comparing the graphs of FIGS. 11 and 13 with those of FIGS. 12 and 14 that a unified single emission direction peak directed to a generally frontal direction is obtained and no split remains.

Figure 7:
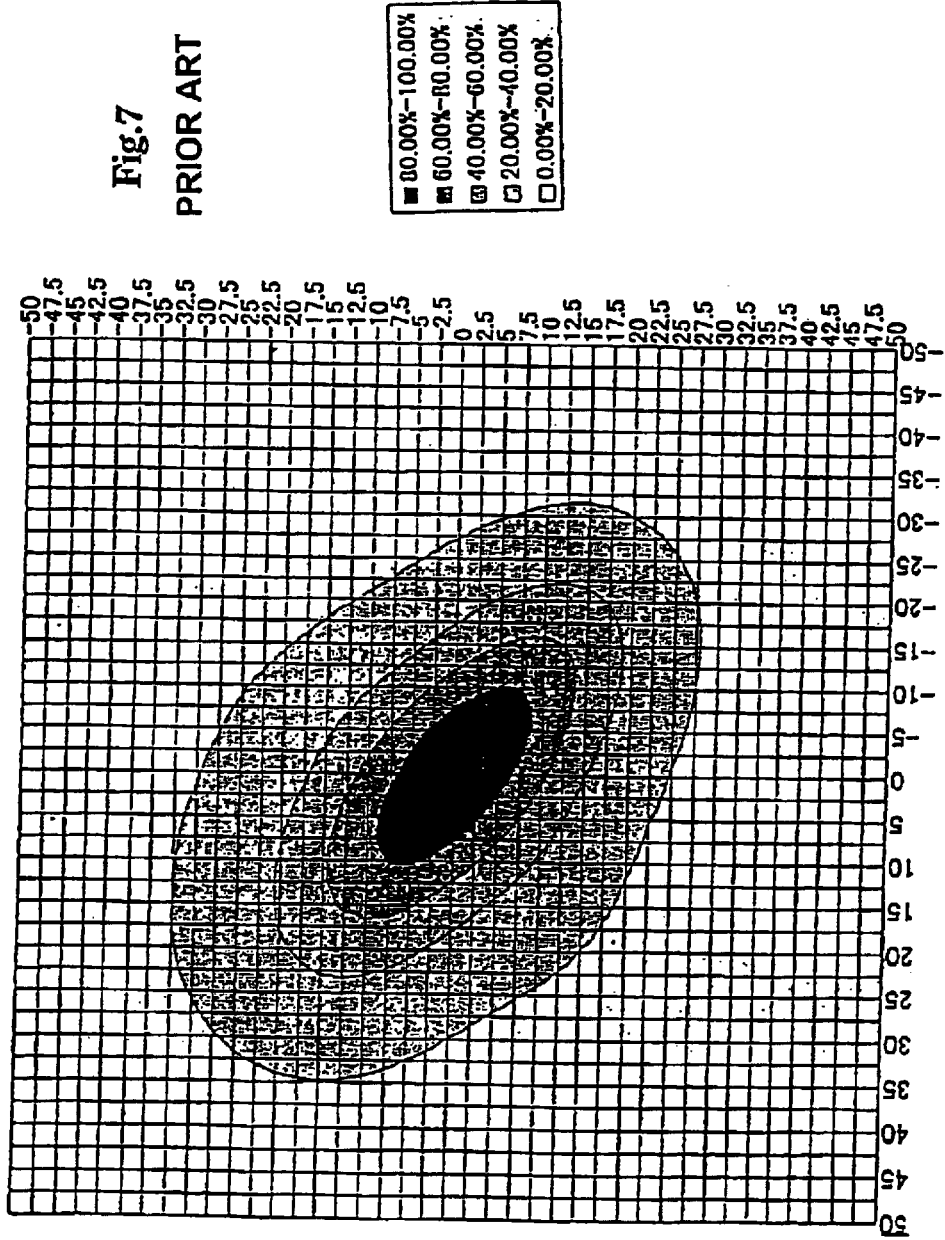
FIG. 7 is a graph shows an example of result obtained from a simulation calculation in a case under a condition such that a light diffusing sheet is disposed in addition to the arrangement considered in FIG. 5, wherein light intensity (after cosine-correction) is illustrated in gray scale levels.
Figure 8:
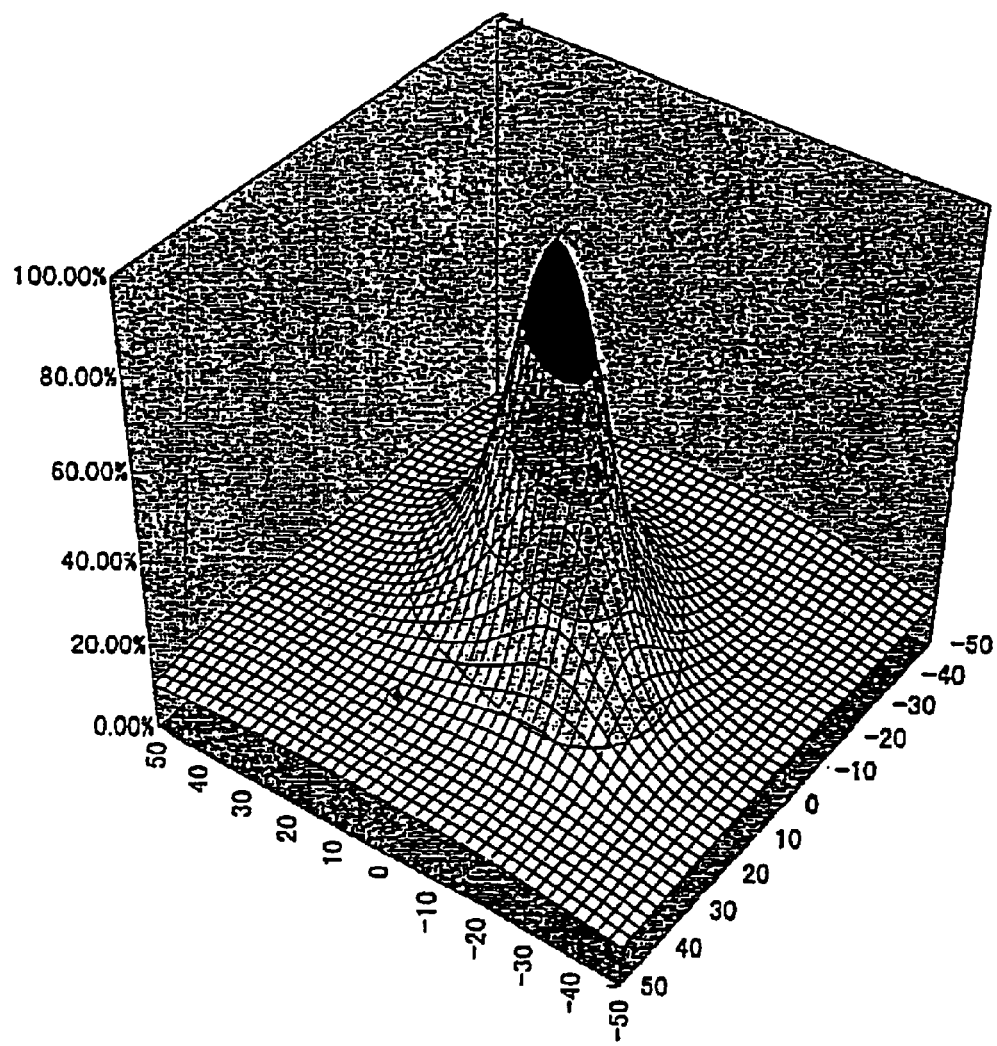
FIG. 8 is a graph made from the results of the same simulation calculation as in FIG. 7, wherein light intensity (after cosine-correction) is illustrated in gray scale levels and three-dimensional isobrightness curves are plotted.

Further to this, comparing with the case of FIGS. 7 and 8 (no peak split under standard configuration and light diffusion sheet having the same characteristics as in FIGS. 13 and 14), it is understood that an improved angular extent regarding +y-directions remarkably like circle is not only obtained but also the obtained characteristics have a maximum relative intensity region (the thickest part) occupying a large area.

It is noted that FIG. 13 also shows a grey-scale pattern like an ellipse which has a longitudinal axis corresponding approximately to +x-direction (inclined about 45 degrees with respect to +X-direction due to simulation condition in this case). It is further to be noted that +x-direction corresponds to an orientation direction of a micro-reflector 80 (i.e. running direction of valley bottom portion 85) as viewed from above the emission face 33.

Such improved characteristics of the illumination output light inherited by the liquid crystal display having the liquid crystal display panel PL illuminated by the illumination output light, with the result that the liquid crystal display has a viewing field excellent in angular extent and isotropy.

The inner-reflection faces 81 and 82 for generating non-parallel inner output light fluxes may be inclined symmetrically and oppositely each other with respect to an imaginary reference plane that passes the valley bottom 85 and is perpendicular to the emission face 33.

For example, if the micro-reflector 80 is rotationally shifted around y-axis by a small angle, peak split is maintained except under special condition.

Figure 3:
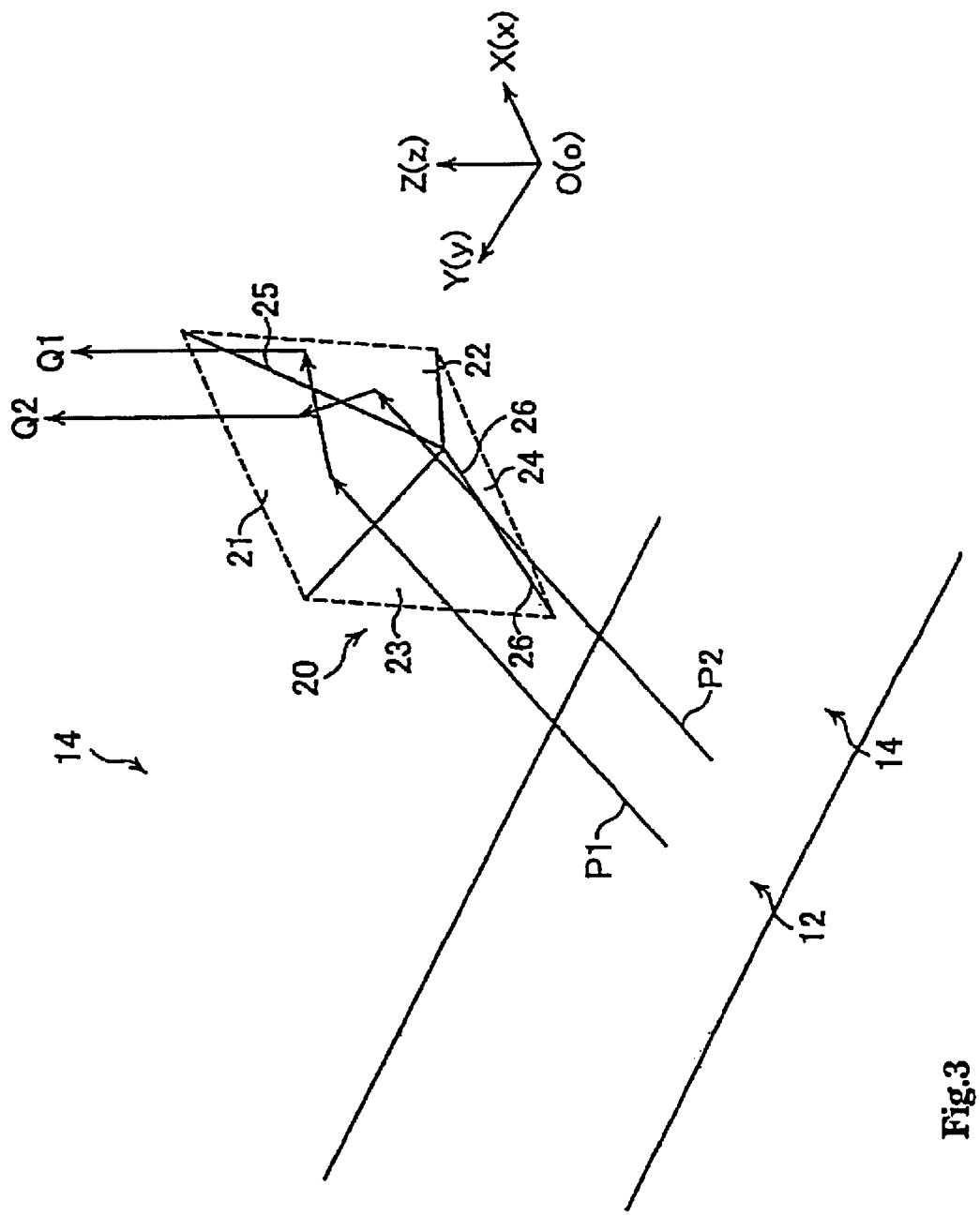
FIG. 3 shows one micro-reflector 20 employed in prior arts and illustrates how an inner output light is generated from an inner propagation light.

Finally, some supplementary description on orientation (around z-axis) of micro-reflectors 80 on the back face 34 is as follows. Although almost all micro-reflectors 80 have x-axes perpendicular to the incidence face 32 (corresponding to X-axis in FIG. 3), some generally around the corner portions have x-axis directions inclined to a center part of the incidence face 32.

Figure 15:
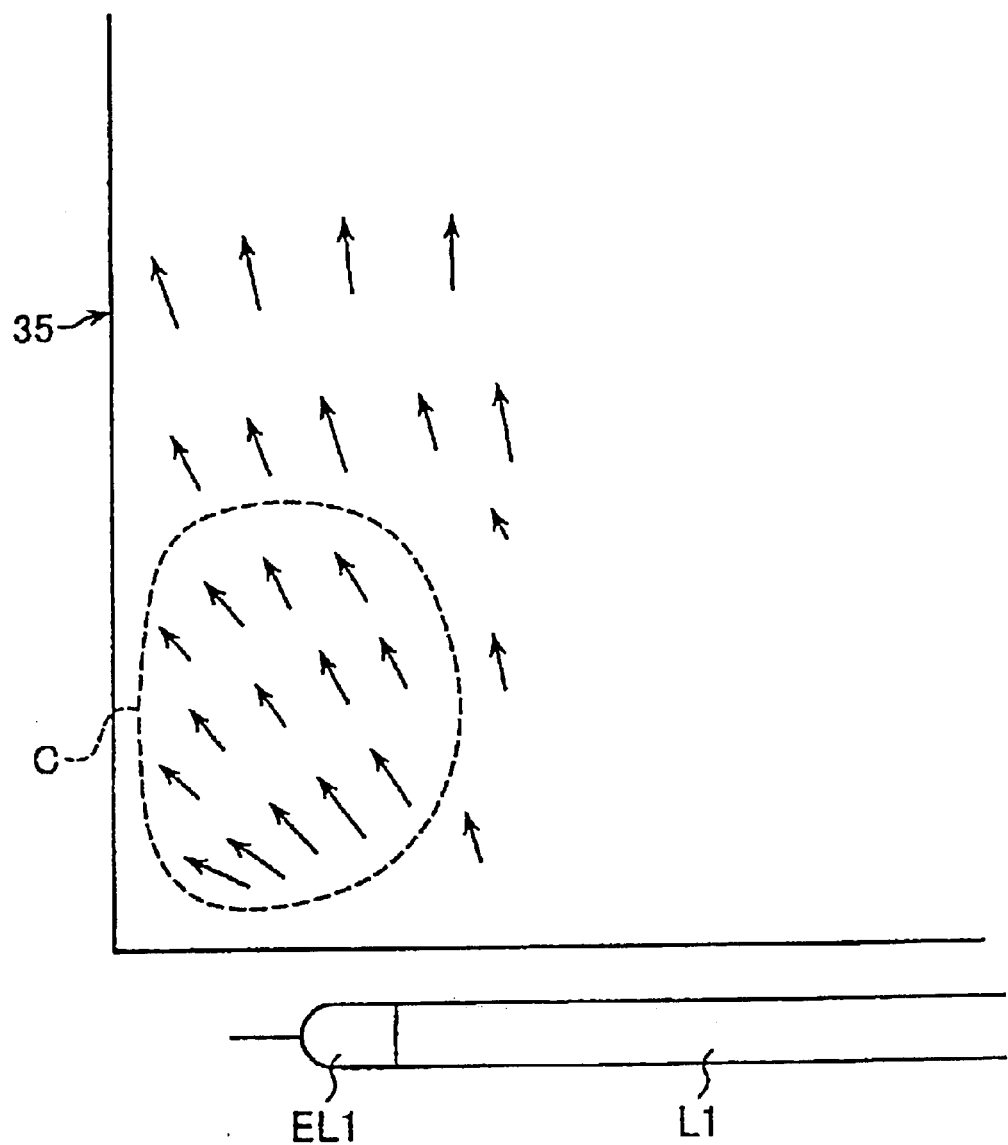
FIG. 15 shows the vicinity of area C as an example for illustrating a relation between x-direction and an incidence face.

This is exemplarily illustrated in FIG. 15 showing the vicinity of area C. Arrows indicate distribution of +x-direction at corresponding positions.

Figure 16:
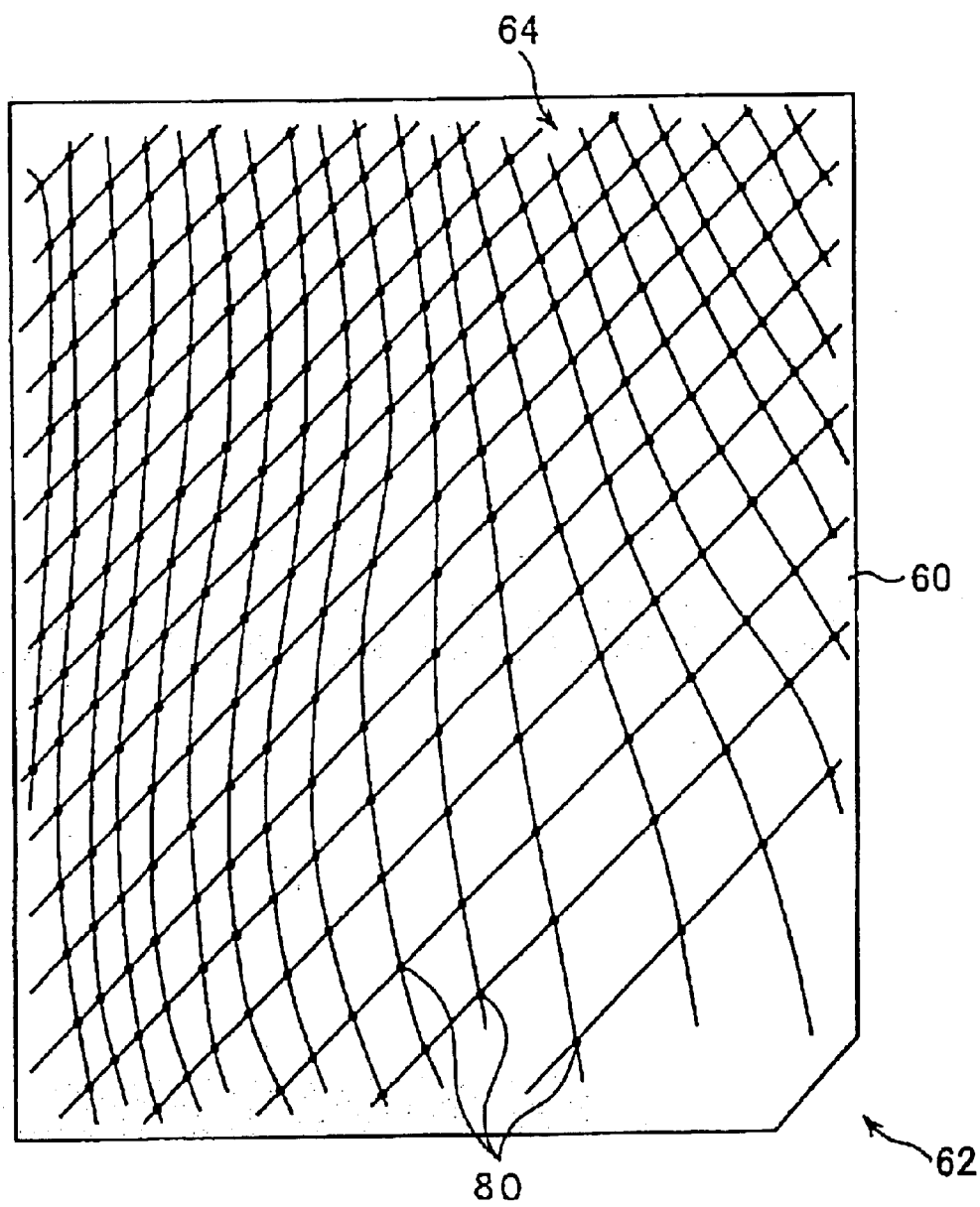
FIG. 16 illustrates an example of arrangement such that primary light is supplied through a corner portion of a light guide plate; and, FIG. 17 illustrates a distribution of x-directions in the case shown in FIG. 16.
Figure 17:
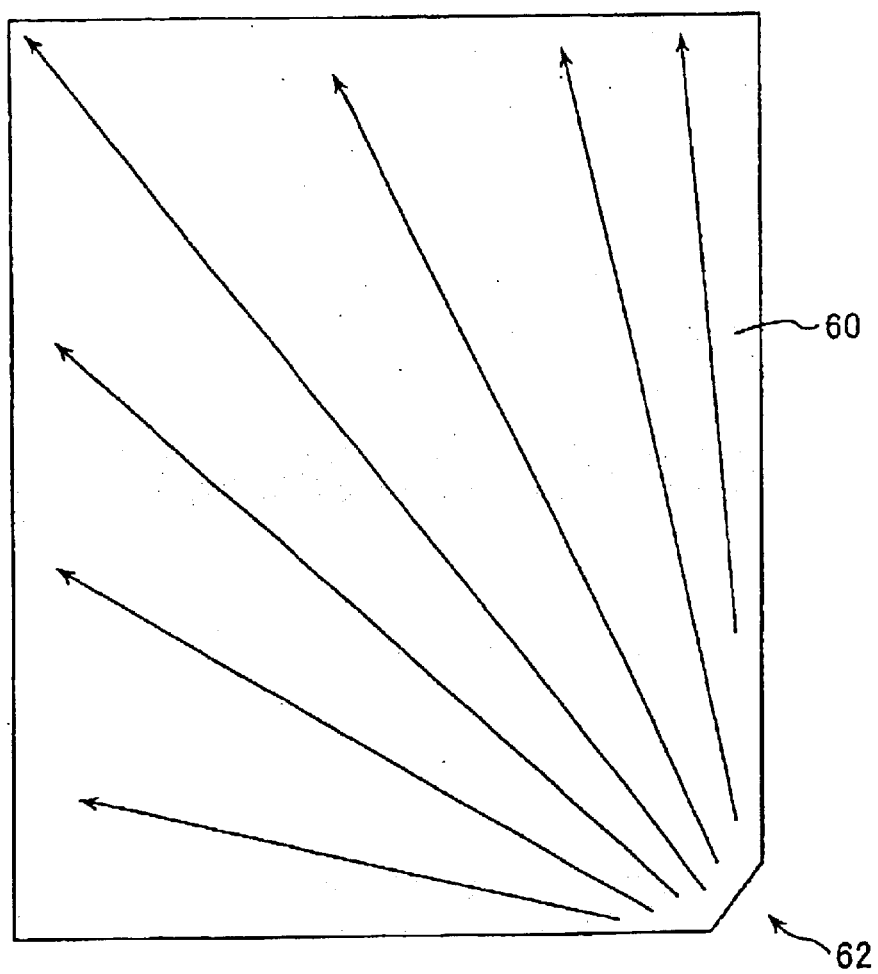

If an alternative arrangement as shown in FIG. 16 is employed, wherein a corner portion 62 is supplied with primary light micro-reflectors 80 are arrayed on a back face 64 of a light guide plate 60 as illustrated, +x-directions are distributed as shown in FIG. 17.

In FIG. 17, curves like network are ones passing micro-reflector-arrayed positions and lattice point "·" corresponding to a micro-reflector-arrayed position. Each micro-reflector 80 located at a lattice point has a posture deviated from the standard configuration in the same manner as in the above-described embodiment.

As understood from the above detailed description, the present invention provided a light guide plate which has not only a viewing angle expanded also regarding the right-and-left-width directions as viewed from an input side of a micro-reflector but also a reduced fine unevenness in brightness caused depending on micro-reflector-formed location or micro-reflector-absent location. This light guide plate is applied to a surface light source device and liquid crystal display, which can show a reduced fine unevenness in brightness. In these surface light source device and liquid crystal display, fine unevenness in brightness caused depending on micro-reflector-formed location or micro-reflector-absent location is expected to be relaxed.

What is claimed is:

1. A surface light source device, comprising:
   a primary light source;
   a light guide plate supplied with light from said primary light source; and
   a light diffusion member, wherein
   said light guide plate has an emission face provided by a major face, a back face provided by another major face opposite with said emission face and an incidence face for being supplied with light from said primary light source,
   said back face being provided with a great number of projection-like micro-reflectors for light-travelling-direction-conversion,
   each of said micro-reflectors has a conversion-output-portion including a first inner-reflection face and a second inner-reflection face which provide a valley in said light guide plate and meet each other as to give a valley bottom of said valley,
   said valley being opened as to get deeper and wider toward a main light coming direction of an inner input light reaching the valley, thereby generating an inner output light reaching the valley, thereby generating an inner output light containing a first inner output light and a second inner output light from said inner input light reaching the valley,
   the first inner output light being produced through being inner-reflected by said first inner-reflection face and then by said second inner-reflection face,
   the second inner output light being produced through being inner-reflected by said second inner-reflection face and then by said first-inner reflection face,
   said first and second inner-reflection faces being inclined so that said first inner output light and said second inner output light are non-parallel and thereby said emission face provides a direction-split emission having two emission intensity peaks,
   said light diffusion member being disposed along said emission face in order to input said direction-split emission having the two intensity peaks thereto and to output an emission having a single emission intensity peak by dissolving said direction-split emission.

2. A surface light source device according to claim 1, wherein said first and second inner-reflection faces are inclined symmetrically and oppositely each other with respect to an imaginary reference place that passes said valley bottom and is perpendicular to said emission face.

3. A liquid crystal display, comprising:
   a liquid crystal display panel; and
   a surface light source device illuminating said liquid crystal display panel, said surface light source device including:
   a primary light source;
   a light guide plate supplied with light from said primary light source; and
   a light diffusion member, wherein
   said light guide plate has an emission face provided by a major face, a back face provided by another major face opposite with said emission face and an incidence face for being supplied with light from said primary light source,
   said back face being provided with a great number of projection-like micro-reflectors for light-travelling-direction conversion,
   each of said micro-reflectors has a conversion-output-portion including a first inner-reflection face and a second inner-reflection face which provide a valley in said light guide plate and meet each other as to give a valley bottom of said valley,
   said valley being opened as to get deeper and wider toward a main light coming direction of an inner input light reaching the valley, thereby generating an inner output light containing a first inner output light and a second inner output light from said inner input light reaching the valley,
   the first inner output light being produced through being inner-reflected by said first inner-reflection face and then by said second-inner reflection face,
   the second inner output light being produced through being inner-reflected by said second inner-reflection face and then by said first inner-reflection face,
   said first and second inner-reflection faces being inclined so that said first inner output light and said second inner output light are non-parallel and thereby said emission face provides a direction-split emission having two emission intensity peaks,
   said light diffusion member being disposed along said emission face in order to input said direction-split emission having the two intensity peaks thereto and to output an emission having a single emission intensity peak by dissolving said direction-split emission.

4. A liquid crystal display according to claim 3, wherein said first and second inner-reflection faces are inclined symmetrically and oppositely each other with respect to an imaginary reference plane that passes said valley bottom and is perpendicular to said emission face.

5. A surface tight source device, comprising:
   a primary light source;
   a light guide plate supplied with light from said primary light source, and having an emission face and a back face opposite to the emission face;
   a plurality of micro-reflectors provided on the back face, each of the micro-reflectors having a conversion-output-portion including a first inner-reflection face and a second inner-reflection face to produce a first inner output light by being inner-reflected by the first inner-reflection face and then by the second-inner reflection face, and a second inner output light by being inner-reflected by the second inner-reflection face and then by the first inner-reflection face, wherein said first and second inner-reflection faces are inclined so that the first inner output light and the second inner output light are non-parallel so that the emission face provides a direction-split emission having two emission intensity peaks, and said light diffusion member is disposed along said emission face to input the direction-split emission having the two intensity peaks thereto and to output an emission having a single emission intensity peak by dissolving the direction-split emission.

6. A liquid crystal display, comprising:

a liquid crystal display panel; and a surface light source device illuminating said liquid crystal display panel, said surface light source device including:
- a primary light source;
- a light guide plate supplied with light from said primary light source, and having an emission face and a back face opposite to the emission face;
- a plurality of micro-reflectors provided on the back face, each of the micro-reflectors having a conversion-output-portion including a first inner-reflection face and a second inner-reflection face to produce a first inner output light by being inner-reflected by the first inner-reflection face and then by the second-inner reflection face, and a second inner output light by being inner-reflected by the second inner-reflection face and then by the first inner-reflection face, wherein said first and second inner-reflection faces are inclined so that the first inner output light and the second inner output light are non-parallel so that the emission face provides a direction-split emission having two emission intensity peaks, and said light diffusion member is disposed along said emission face to input the direction-split emission having the two intensity peaks thereto and to output an emission having a single emission intensity peak by dissolving the direction-split emission.

* * * * *